3,408,268
RECOVERY OF SPENT GLYCOL BY DISTILLATION IN THE PRESENCE OF WATER
James W. Pitts, Port Neches, and Robert R. Reese, Austin, Tex., assignors to Jefferson Chemical Company, Inc., Houston, Tex., a corporation of Delaware
Filed Oct. 27, 1966, Ser. No. 590,059
6 Claims. (Cl. 203—78)

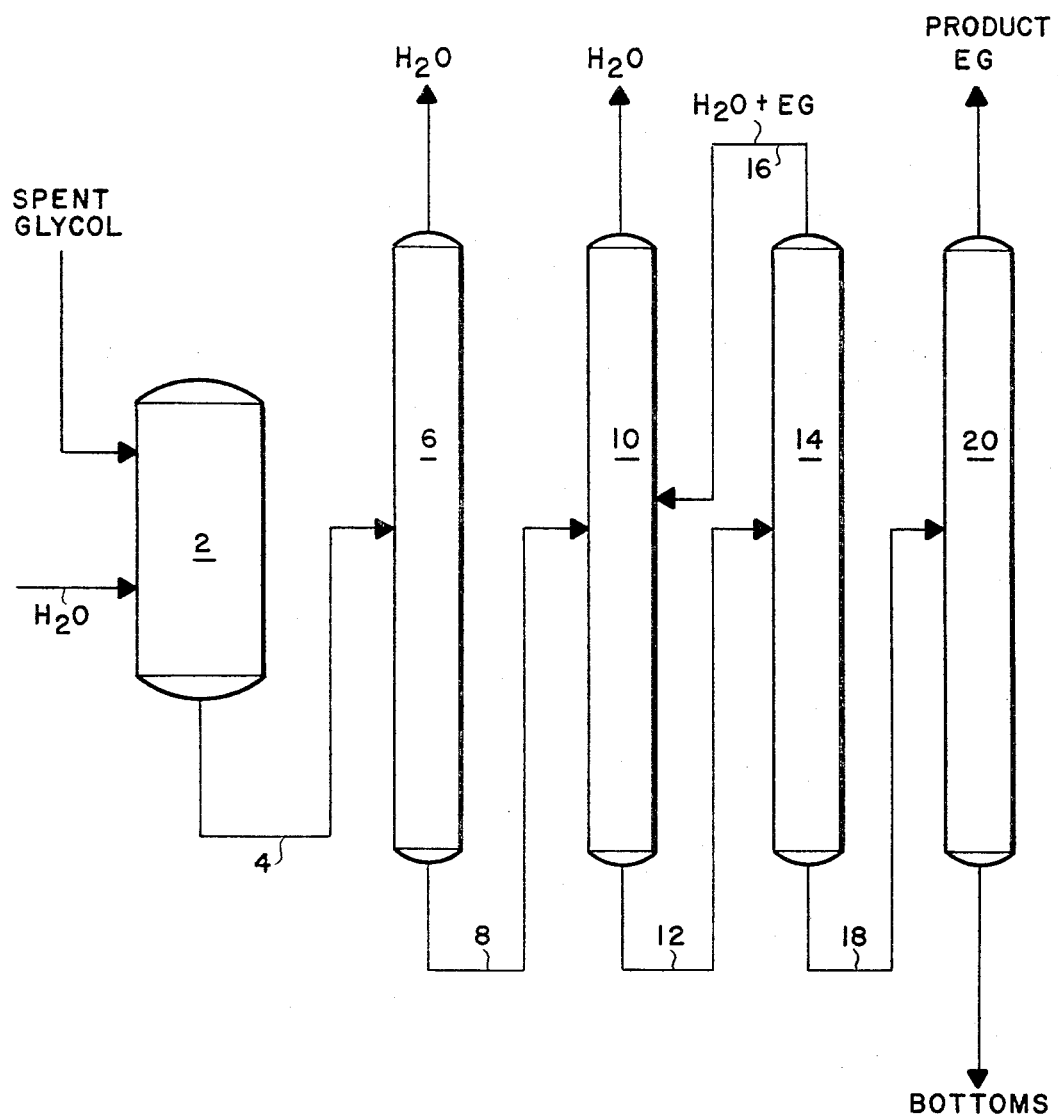

ABSTRACT OF THE DISCLOSURE

Purified ethylene glycol can be recovered from terephthalate spent glycol streams by adding from 2% to 25% water and distilling the aqueous spent glycol followed by a subsequent distillation to remove the purified ethylene glycol.

---

This invention is concerned with the recovery of good quality ethylene glycol from the spent glycol from polyester production. More particularly, this invention is concerned with the recovery of good quality ethylene glycol by the addition of water to the spent glycol, followed by a dewatering distillation.

In the production of a variety of polyesters from ethylene glycol, much of the ethylene glycol used in the process is unreacted. This unreacted ethylene glycol residue contains about 80% to 98% ethylene glycol and is commonly referred to by the trade as "spent glycol." One especially important polyester, for example, is that obtained from dimethylterephthalate and ethylene glycol, which is used in the production of fibers. Impurities contained in the spent glycol from such a process include methanol, dimethylterephthalate, higher esters, acetals and metallic catalyst residues. There may also be small amounts of water present.

Because of the impurities present, spent glycol is unfit for most uses without reprocessing or purification. Ethylene glycol may be recovered from spent glycol by a series of distillation steps but the losses are excessive and the quality of the ethylene glycol recovered is poor. It has an odor and clouds when water is added.

We have now discovered that ethylene glycol of good quality may be recovered from spent glycol with minimum losses if from 2% to 25% water, by weight, is added to the spent glycol followed by a dewatering distillation. More than 25% water may be added but will not yield a greatly improved quality of product. Odor bodies and water insoluble products are removed from the spent glycol by the water stripping process.

In accordance with our recovery procedure, from 2% to 25%, preferably from 15% to 25% water, by weight, is added to spent glycol and the aqueous spent glycol is then fed to a distillation column where water is removed. This dewatering column may be operated at any convenient pressure; however, we have found that pressures of from 100 to 800 mm. are optimum. At pressures below 100 mm. condensation of the overhead from the column presents a problem, while at pressures above 800 mm. equipment costs are higher. Bottoms from the dewatering tower, containing ethylene glycol, are then fed to another distillation tower where product ethylene glycol is distilled overhead. Because of the high boiling point of ethylene glycol, this product tower is preferably operated at subatmospheric pressures such as, for example, a pressure between about 1 and 50 mm. A particularly preferred pressure is from about 15 to 20 mm.

In a preferred embodiment of our invention a further improvement in glycol quality is obtained by removing 1 to 5 weight percent of the ethylene glycol with the water. More ethylene glycol may be removed but does not result in further improvement. To avoid loss of the ethylene glycol removed, the water-ethylene glycol stream may be recycled to the process.

The removal of the water may be accomplished in one or a series of columns, all in accordance with established engineering techniques. If 1% to 5% of the ethylene glycol is removed, it is removed with the last of the water. Where the water is taken off in a series of columns, a portion of the water, for example, 5% to 20% of the water, is preferably left in the spent glycol for removal with the 1% to 5% ethylene glycol removed.

Depending upon the nature and amount of impurities present in the spent glycol, it may be advantageous to pretreat spent glycol before using our recovery procedure. For example, if large amounts of methanol are present, it is preferable to remove methanol prior to the use of our treatment. This may conveniently be done by a flash distillation of the methanol. If the spent glycol contains excessive amounts of solid impurities it is preferred to initially feed the spent glycol through an evaporator, taking the glycol overhead and thus removing solid impurities. In any event, regardless of the pretreatment employed, the quality of the recovered glycol is improved if our procedure is followed.

Our invention will be further illustrated with reference to the accompanying drawing which depicts the preferred embodiment of the invention. With reference to the drawing, spent glycol, whether pretreated or not, and water are fed to a mixer 2 from which aqueous spent glycol is carried by means of line 4 to a first dewatering column 6. In column 6 a portion (preferably about 50%) of the water is distilled overhead. If there has been no pretreatment to remove methanol, it too is taken overhead from column 6. The partially dewatered spent glycol is then taken from column 6 by means of line 8 to a second dewatering column 10. In column 10 a second portion (preferably about 45%) of the water is distilled overhead. The bottoms from column 10 is then taken by means of line 12 to a final dewatering column 14. In column 14 the remainder of the water, along with 1% to 5% of the ethylene glycol, is distilled overhead and is returned by means of line 16 to the second dewatering column 10. The fully dewatered glycol is then taken from column 14 by means of line 18 to a product fractionation column 20. In column 20 the glycol is distilled to take a product ethylene glycol overhead, leaving a bottoms product which may be discarded, or if the spent glycol is subjected to a flash evaporation prior to mixing with water, may be recycled to the evaporator.

The invention will be still further illustrated by the following example:

EXAMPLE I

A sample of spent glycol from a polyester preparation, containing 90% ethylene glycol, 7% methanol 0.5% water and the remainder esters and acetals, was distilled to remove the methanol. To 2,574 grams of the methanol-free spent glycol was added 490 grams of water. The aqueous spent glycol was dewatered at a still head pressure of 100 mm. of mercury and a reboiler temperature of 145° C. The bottoms from the dewatering tower was flash distilled at 1 mm. of mercury taking 99% of the contained ethylene glycol overhead. This recovered ethylene glycol had a Pt-Co color of zero and was essentially odorless. However, the product did haze slightly when a 20:80 glycol-water solution was prepared. Further tests demonstrated that by making a partial (about 95%) dewatering in a first dewatering column and taking 1% to 5% of the ethylene glycol feed overhead with the remaining water in a final dewatering column there resulted a recovered ethylene glycol that was colorless and odorless and was completely haze-free when diluted with water in any and all proportions.

Having thus describel our invention, we claim:

1. A method for the recovery of ethylene glycol from spent glycol which consists essentially of adding 2% to 25% water, by weight, based upon the weight of the spent glycol, to the spent glycol, distilling the aqueous spent glycol to remove water as the more volatile fraction, and distilling the dewatered spent glycol to recover ethylene glycol as the more volatile fraction.

2. A method as in claim 1 wherein 15 to 25 weight percent water is added to the spent glycol.

3. A method as in claim 1 wherein 1 to 5 weight percent of the ethylene glycol is removed with the water.

4. A method as in claim 3 wherein 15 to 25 weight percent water is added to the spent glycol.

5. A method as in claim 3 wherein the water is removed in three steps with 1 to 5 weight percent of the ethylene glycol being removed with 5 to 20 weight percent of the water in the third step.

6. A method as in claim 5 wherein the ethylene glycol and water removed in the third step are recycled to the second dewatering step.

References Cited

UNITED STATES PATENTS

| | | | |
|---|---|---|---|
| 2,510,548 | 6/1950 | Brunjes | 203—18 |
| 2,788,373 | 4/1957 | Mills et al. | 260—637 |

WILBUR L. BASCOMB, JR., *Primary Examiner.*